(12) United States Patent
Xu et al.

(10) Patent No.: US 10,086,778 B2
(45) Date of Patent: Oct. 2, 2018

(54) COVER ASSEMBLY TO DETACHABLY CONTACT AN INTERIOR TRIM AND INTERIOR TRIM ASSEMBLY EMPLOYING THE SAME

(71) Applicant: FORD GLOBAL TECHNOLOGIES, LLC, Dearborn, MI (US)

(72) Inventors: Tom Xu, Nanjing (CN); Damon Fu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/160,039

(22) Filed: May 20, 2016

(65) Prior Publication Data

US 2016/0362072 A1 Dec. 15, 2016

(30) Foreign Application Priority Data

Jun. 10, 2015 (CN) .......................... 2015 1 0317061

(51) Int. Cl.
*B60R 13/02* (2006.01)

(52) U.S. Cl.
CPC .. *B60R 13/0275* (2013.01); *B60R 2013/0293* (2013.01)

(58) Field of Classification Search
CPC ............ B60R 13/0275; B60R 13/0206; B60R 2013/0293; B60N 3/02
USPC ........................................................ 296/1.08
See application file for complete search history.

(56) References Cited

U.S. PATENT DOCUMENTS

| | | | |
|---|---|---|---|
| 6,019,418 A * | 2/2000 | Emerling ............... | B60J 5/0416 296/146.7 |
| 6,039,465 A | 3/2000 | Hirabayashi et al. | |
| 6,085,483 A | 7/2000 | Kurosaki | |
| 6,308,488 B1 | 10/2001 | Hoshino | |
| 6,419,314 B1 | 7/2002 | Scheerhorn | |
| 6,929,309 B1 | 8/2005 | Radu et al. | |
| 7,104,590 B2 | 9/2006 | Dooley et al. | |
| 7,374,201 B2 * | 5/2008 | Chausset ................. | B60R 21/21 280/728.3 |
| 7,963,551 B2 * | 6/2011 | Matsuoka ............. | B60R 13/025 280/730.2 |
| 8,141,933 B2 * | 3/2012 | Nakamura ............... | B60N 3/02 296/146.7 |
| 8,844,992 B1 * | 9/2014 | Noga .................. | B60R 13/0206 24/289 |

(Continued)

FOREIGN PATENT DOCUMENTS

DE 102006037854 A1 * 3/2008 ............. B60R 13/02

*Primary Examiner* — Pinel E Romain
(74) *Attorney, Agent, or Firm* — Vichit Chea; King & Schickli, PLLC

(57) ABSTRACT

The present invention, in one or more embodiments, provides a cover assembly to detachably contact an interior trim. The cover assembly includes a cover, having along a longitudinal direction, head and tail portions and a middle portion positioned there-between. The middle portion has, along the longitudinal direction, first and second middle portions and a bridge portion positioned there-between. The first middle portion has an elevation along a transverse direction over the second middle portion via the bridge portion, where the cover is to disengage the interior trim when a pre-determined force is exerted onto the bridge portion in an exertion direction from the second middle portion toward the first middle portion.

20 Claims, 4 Drawing Sheets

(56) References Cited

U.S. PATENT DOCUMENTS

| | | | | |
|---|---|---|---|---|
| 9,162,633 | B2* | 10/2015 | Takezawa | B60R 13/0206 |
| 2008/0240851 | A1* | 10/2008 | Spitz | B60N 3/026 |
| | | | | 403/374.2 |
| 2012/0104784 | A1* | 5/2012 | Sapak | B60R 13/0206 |
| | | | | 296/1.08 |
| 2015/0329057 | A1* | 11/2015 | Tiboni | B60R 13/0243 |
| | | | | 296/37.13 |

* cited by examiner

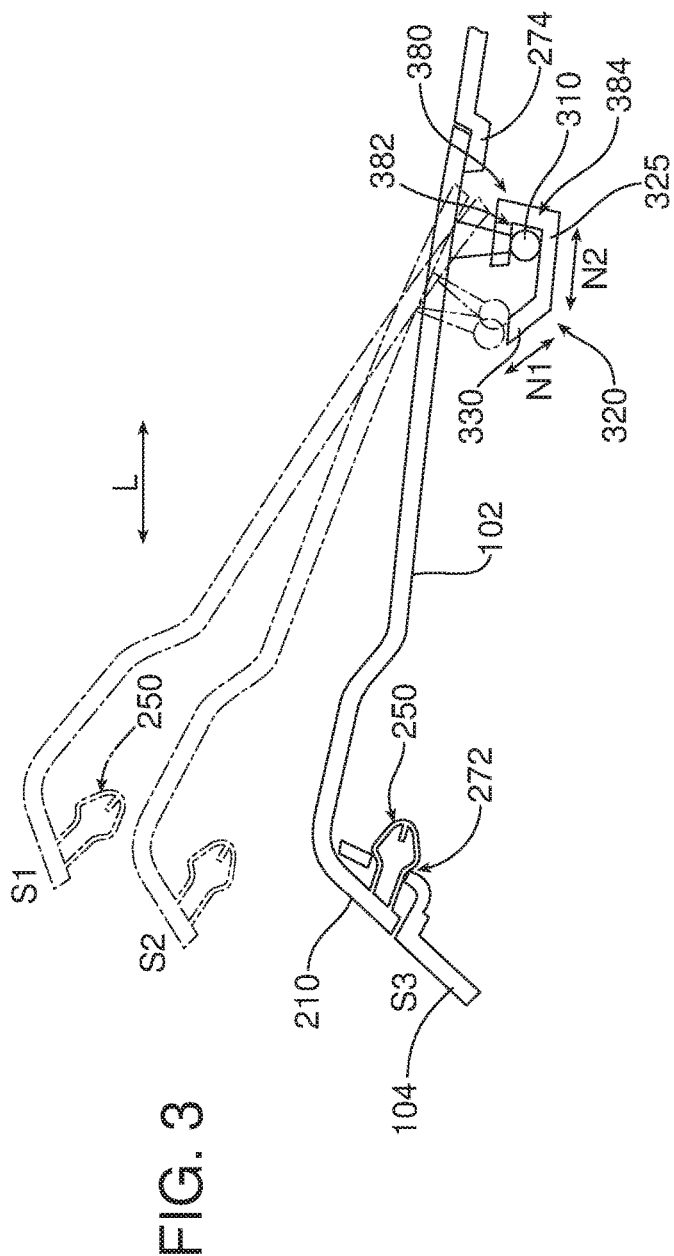

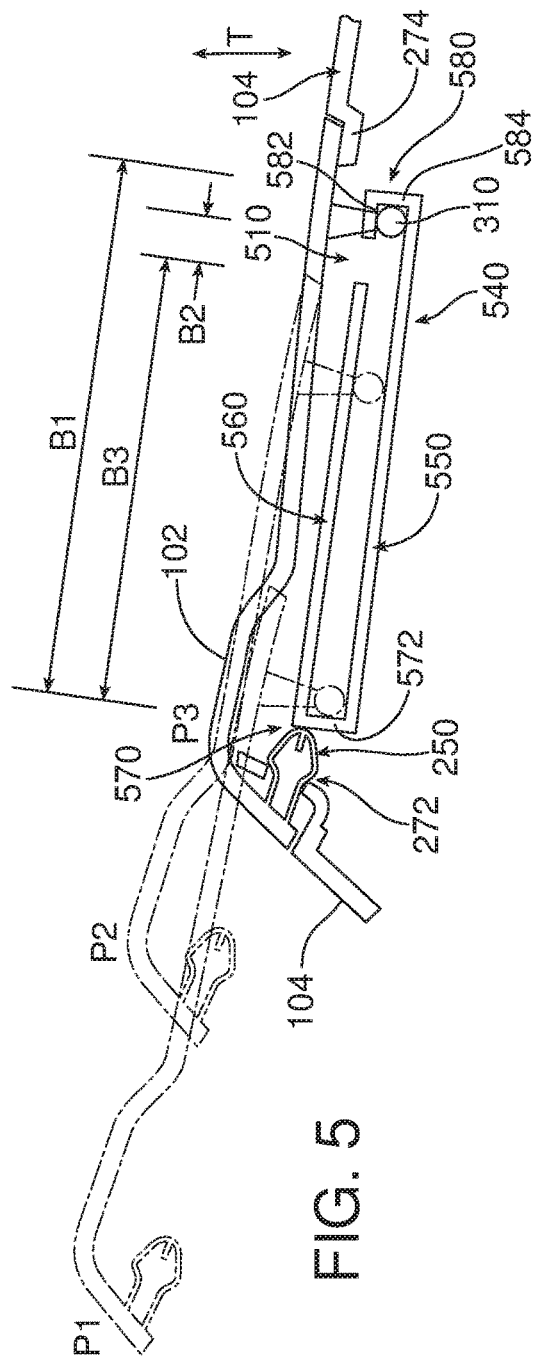
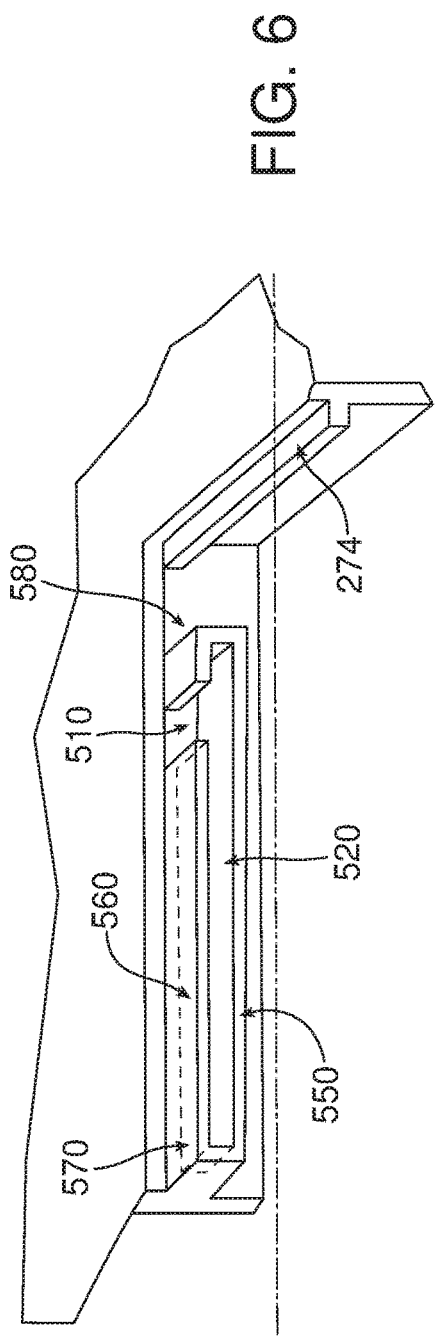

COVER ASSEMBLY TO DETACHABLY CONTACT AN INTERIOR TRIM AND INTERIOR TRIM ASSEMBLY EMPLOYING THE SAME

RELATED APPLICATION

This application claims the benefit of Chinese New Invention Patent Application No.: CN 201510317061.5, filed on Jun. 10, 2015, the entire contents thereof being incorporated herein by reference.

TECHNICAL FIELD

The present invention relates to a cover assembly to detachably contact an interior trim and an interior trim assembly employing the same.

BACKGROUND

Interior trims may often be employed to improve aesthetic feel of a vehicle interior. When necessary, decorative interior trims may be dissembled to facilitate maintenance operations.

For instance, U.S. Pat. No. 6,085,483 discloses a vehicle trim assembly, where a number of protruding hooks are employed to secure the trim to the body of a vehicle.

For instance also, U.S. Pat. No. 6,929,309 discloses a door trim assembly with a removable access panel, where the access panel is connected to a door trim panel via connectors received through respective apertures.

SUMMARY

According to one aspect of the present invention, a cover assembly is provided to detachably contact an interior trim, where the cover assembly includes a cover having, along a longitudinal direction, a head portion, a tail portion and a middle portion positioned there-between, the middle portion having, along the longitudinal direction, a first middle portion, a second middle portion and a bridge portion positioned there-between, the first middle portion being of an elevation along a transverse direction over the second middle portion via the bridge portion, and where the cover is to disengage the interior trim when a pre-determined force is exerted onto the bridge portion in an exertion direction from the second middle portion toward the first middle portion.

According to another aspect of the present invention, an interior trim assembly is provided to include a cover having, along a longitudinal direction, head and tail portions and a middle portion positioned there-between, the middle portion having along the longitudinal direction first and second middle portions and a bridge portion positioned there-between, the first middle portion being of an elevation along a transverse direction over the second middle portion via the bridge portion; and a base to support the cover, where the cover is to disengage the base when a pre-determined force is exerted onto the bridge portion in an exertion direction from the second middle portion toward the first middle portion.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein:

FIG. 3 illustratively depicts an alternative view of the cover in relation to the interior trim assembly referenced in FIG. 1;

FIG. 4 illustratively depicts a partial cross-sectional view of the interior trim assembly referenced in FIG. 3;

FIG. 5 illustratively depicts yet another alternative view of the cover in relation to the interior trim assembly referenced in FIG. 1; and FIG. 6 illustratively depicts a partial cross-sectional view of the interior trim assembly referenced in FIG. 5.

DETAILED DESCRIPTION

Figure 1:
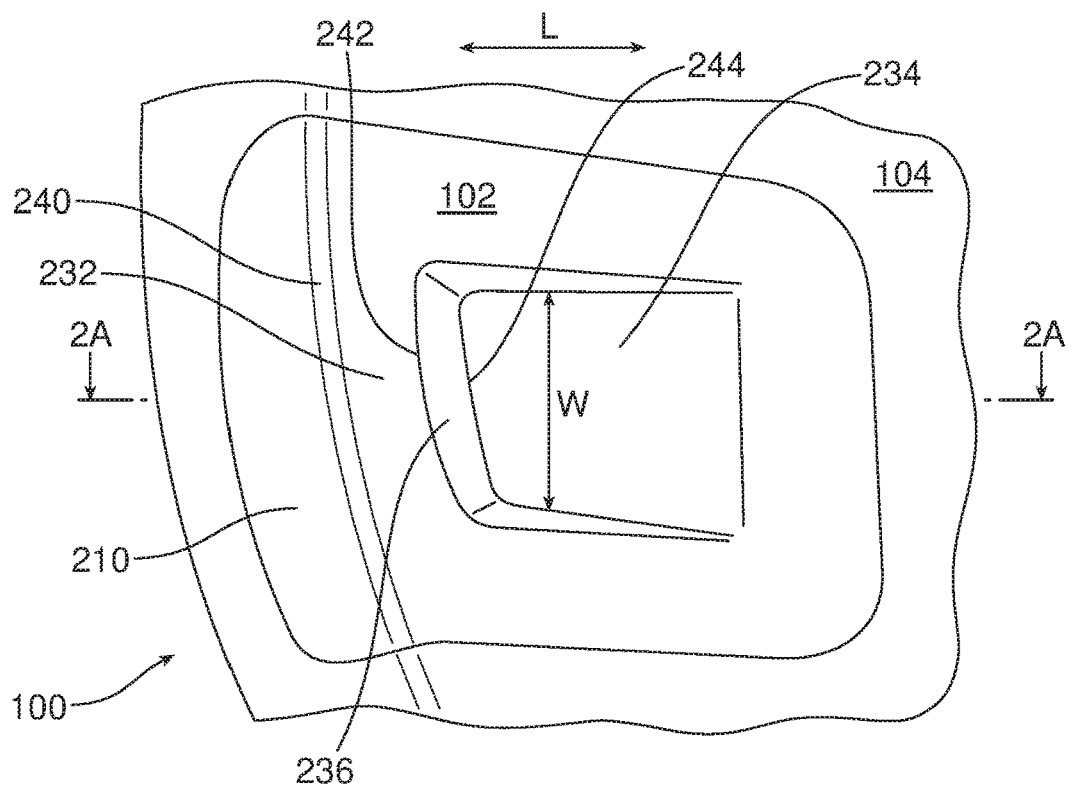
FIG. 1 illustratively depicts a perspective view of an interior trim assembly including a cover engaged with an interior trim according to one or more embodiments of the present invention.

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

To create an inviting appearance and/or an aesthetic feel, and sometimes also to prevent dust accumulation or to provide additional protection for safety, covers may be provided to cover openings. During maintenance as desirable, the cover may be removed to expose the opening and to facilitate the maintenance. There have been some existing cover designs, while without wanting to be limited by any particular theory, it is believed that these existing cover designs may still be somewhat deficient. For instance, it may be difficult for certain of these existing designs to accommodate fast installation and easy removal. For instance also, certain of these existing designs may be of physical appearance that is less than pleasant due to exposed gaps or clearances needed for tool access and dust accumulation at or around these gaps and clearances.

To address one or more of these problems, an improved cover is provided to facilitate installation and removal with relatively greater ease and an improved interior trim assembly is provided with relatively better appearance.

FIG. 1 illustratively depicts a perspective view of an interior trim assembly 100 according to one or more embodiments. FIG. 1 depicts a surface, and in particular a smooth surface presentable to a user, including a base 104, or in particular an interior trim panel 104, being engaged with a cover 102. As a result of the structure of the cover 102 which is further discussed in view of the drawings, the cover 102 becomes intimately engaged to cover an opening of the interior trim panel 104 and no additional groove, gap, or clearance may be required to accommodate tooling for engaging or disengaging the cover 102. The interior trim panel 104 may be of any suitable structure and be in any suitable location of the vehicle, with non-limiting examples thereof including an interior door trim panel, an overhead console trim panel, central console trim panel, and back storage trim panel.

Figure 2A:
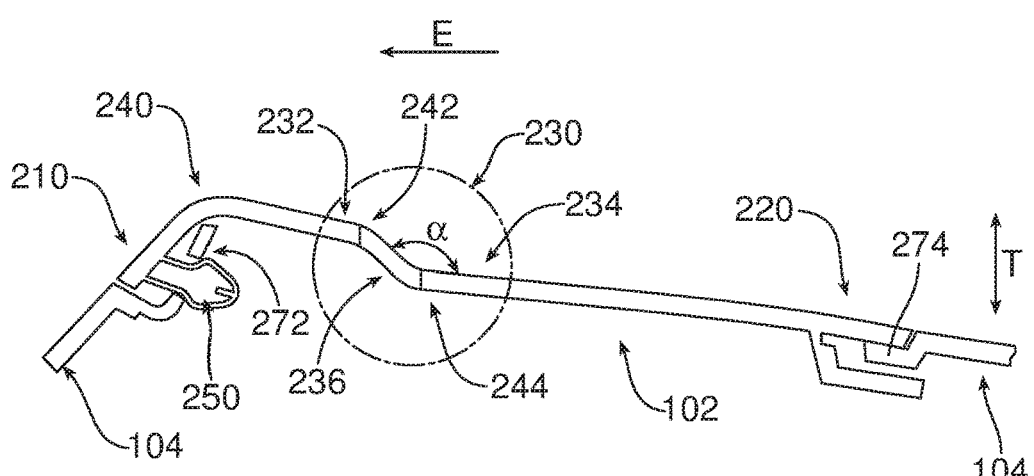
FIG. 2A illustratively depicts a cross-sectional view of the interior trim assembly referenced in FIG. 1.

FIG. 2A illustratively depicts a cross-sectional view taken along line 2A-2A of the vehicle interior trim assembly 100 referenced in FIG. 1. As is shown in FIG. 1 and FIG. 2A, the cover 102 is engaged with the interior trim panel 104.

With further reference to FIGS. 1 and 2, the cover 102 includes along a longitudinal direction L a head portion 210, a tail portion 220 and a middle portion 230 positioned there-between. The middle portion 230 may further include along the longitudinal direction L first and second middle portions 232, 234 and a bridge portion 236 positioned there-between. In certain embodiments and further in view of FIG. 2A, the first middle portion 232 is of an elevation along a transverse direction T over the second middle portion 234 via the bridge portion 236, where the cover 102 is to disengage the interior trim panel 104 when a predetermined force is exerted onto the bridge portion 236 in an exertion direction E from the second middle portion 234 toward the first middle portion 232. In other words, the presence of the bridge portion 236 helps provide a readily available area of access for pushing by an operator's thumb and/or palm.

As is mentioned herein elsewhere, an engagement of the cover 102 to the interior trim panel 104 may be readily effectuated by exerting a force onto the head portion 210 in a direction toward the tail portion 220; and a disengagement of the cover 102 from the interior trim panel 104 may be readily effectuated by exerting another force onto the bridge portion 236 in an opposite direction that is toward the head portion 210. The predetermined force may be decided according to the engagement structure of the cover 102 relative to interior trim panel 104. For instance, if the engagement is relatively secure, the predetermined force may be relatively larger.

Referring back again to FIG. 2A, and in one or more embodiments, the first middle portion 232 and the bridge portion 236 of the cover 102 define there-between a first intersection 242, the second middle portion 234 and the bridge portion 236 define there-between a second intersection 244. The first intersection 242 is positioned between the head portion 210 and a second intersection 244 along the longitudinal direction L as illustratively depicted in FIG. 1. In some embodiments, and along the traverse direction T, the first intersection 242 is of a greater elevation relative to the tail portion 220 than an elevation of the second intersection 244 relative to the tail portion 220. In some other embodiments, the first intersection 242 and/or the second intersection 244 may each be configured as a smooth turning plateau instead of a sharp or sudden turning point.

Referring back again to FIG. 2A, and in some embodiments, the cover 102 further includes a turning portion 240 positioned between the head portion 210 and the first middle portion 232 along the longitudinal direction L, where the turning portion 240 may be of an elevation greater than that of the first middle portion 232 relative to the second middle portion 234 along the transverse direction T. Without wanting to be limited by any particular theory, it is believed that the head portion 210 of the cover 102 is positioned to advantageously facilitate relatively easy installation, as one may simply push the head portion 210 into an engagement position, and the head portion 210 may then provide covering to and further protect any interior structures such as gaps and joints from dust accumulation and adverse impact on physical appearance. The bridge portion 236 of the middle portion 230 of the cover 102 may be of a slope along the longitudinal direction T. In other words, the first middle portion 232 is of an elevation relative to the second middle portion 234. The proposed design is believed to provide greater ease in removing the cover 102 without having to need additional tools and the removal may be carried out by imparting force onto the surface of the bridge portion 236 to disengage the cover 102 away from the interior trim panel 104.

In one or more embodiments, the bridge portion 236 is of an angle $\alpha$ relative to the second middle portion 234, and the angle $\alpha$ may be of any suitable values, with non-limiting ranges thereof including 80 degrees to 150 degrees, and 85 degrees to 120 degrees.

Proportions of various segments of the cover 102, such as the head portion 210, the turning portion 240, the first and second middle portions 232, 234, the bridge portion 236 and the tail portion 220 as illustratively depicted in FIG. 2A, are not limiting and may be of any suitable values as long as the bridge portion 236 is so positioned to effectuate such engagement and disengagement of the cover 102 relative to the interior trim panel 104 mentioned herein elsewhere.

In one or more embodiments, one or more connectors may be used to connect the cover 102 and the interior trim panel 104. Referring back to FIG. 2A, the cover 102 may include a connector such as one that is depicted as a protrusion 250. The protrusion 250 extends from the head portion 210 toward the tail portion 220. Accordingly, the interior trim panel 104 may have an aperture 272 to engage the protrusion 250, where the protrusion 250 may further include an end with an inclined surface to facilitate engagement into the aperture 272. Further the end of the protrusion 250 may include a portion of which at least one cross-section is larger than a cross-sectional dimension of the aperture 272 such that the protrusion 250 does not unexpectedly disengage from the aperture 272 unless and until a predetermined force is applied.

The general direction of the protrusion 250 being pushed into the aperture 272 or being disengaged from the aperture 272 may be termed as the engagement or the disengagement direction, which is closer in degree or more parallel in direction relative to the longitudinal direction L than to the transverse direction T. The engagement and disengagement directions of the bridge portion 236 may be of an angle there-between which is of any suitable values, with non-limiting ranges thereof including 80 degrees to 150 degrees, and 85 degrees to 120 degrees. An engagement position may be reached when the bridge portion 236 is moved along the engagement direction, and disengagement position may be reached when the bridge portion 236 is moved along the disengagement direction.

Referring back to FIG. 1, and in one or more non-limiting embodiments, the bridge portion 236 may be of a width W that is no less than 1 centimeter, 2 centimeters or 3 centimeters. Without wanting to be limited by any particular theory, it is believed that the angle, the width, and/or the elevation along the traverse direction T of the bridge portion 236 may be configured in favor of ergonomic considerations to effect a relatively easy removal and to provide customers with greater satisfaction in use.

The protrusion 250 referenced herein does not necessarily have to be located on the cover 102. In certain embodiments, and as illustratively depicted in FIG. 2B, the interior trim panel 104 may include a protrusion 252, while the cover 102 may include an aperture 276 to engage the protrusion 252. In other words, the aperture 276 may be defined by the cover 102 or its structural extensions.

Figure 2B:
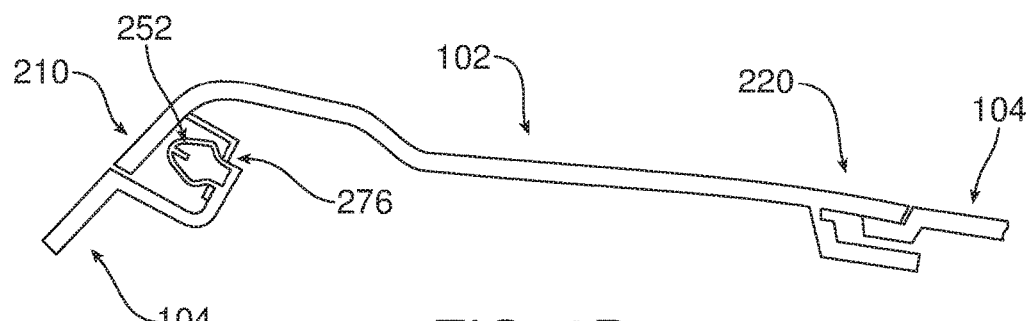
FIG. 2B illustratively depicts an alternative design to the cross-section of the interior trim assembly referenced in FIG. 2A.
Figure 2C:
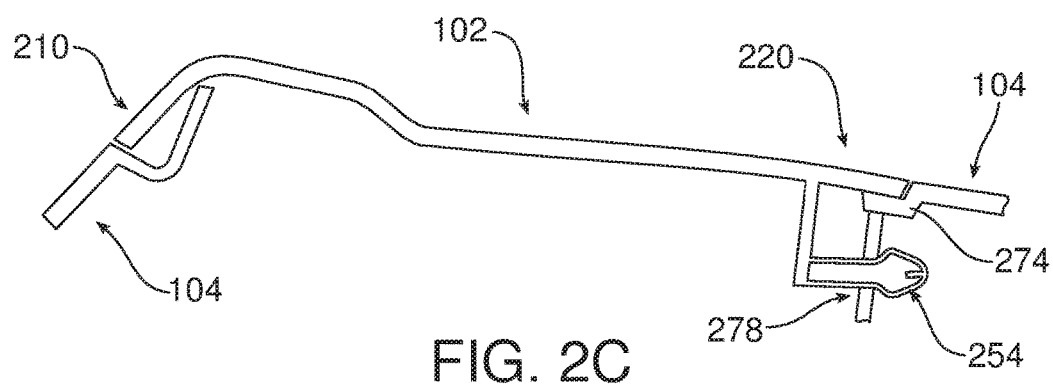
FIG. 2C illustratively depicts yet another alternative to the cross-section of the interior trim assembly referenced in FIG. 2A.

Optionally, and as illustratively depicted in FIG. 2C, a protrusion 254 may be positioned close to the tail portion 220 of the cover 102 and an aperture 278 may be positioned close to the tongue 274 of the interior trim panel 104, such that an engagement or disengagement of the cover 102 relative to the interior trim panel 104 may be realized via the engagement or disengagement of the protrusion 254 relative to the aperture 278. In this configuration, the aperture 278 is positioned on and connected to the interior trim panel 104 and the protrusion 254 is positioned on and connected to the cover 102. In other words, the protrusion 254 is defined by the cover 102 or its extensions.

Figure 2D:
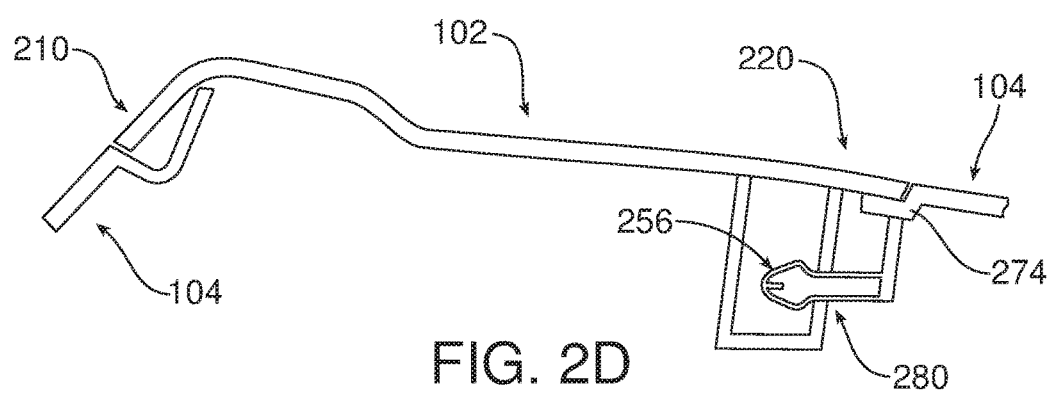
FIG. 2D illustratively depicts yet another alternative to the cross-section of the interior trim assembly referenced in FIG. 2A.

Optionally also, and as illustratively depicted in FIG. 2D, a protrusion 256 may be positioned close to the tongue 274 of the interior trim panel 104 and an aperture 280 may be positioned close to the tail portion 220 of the cover 102, such that an engagement or disengagement of the cover 102 relative to the interior trim panel 104 may be realized via the an engagement or disengagement of the protrusion 256 relative to the aperture 280. In this configuration, the aperture 280 is positioned on and connected to the tail portion 220 of the cover 102 and the protrusion 256 is positioned on and connected to the interior trim panel 104.

For brevity, various embodiments are described herein elsewhere with particular reference to the protrusion 250 and the aperture 272 depicted in FIG. 2A. However, it is noted that these descriptions are equally applicable to the protrusion and aperture configurations depicted in FIG. 2B, FIG. 2C and FIG. 2D.

In one or more embodiments, the cover 102 and/or the interior trim panel 104 may include at least one connector such as connector 250, 252 to prevent disengagement of the cover 102 from the interior trim panel 104. Additionally the cover 102 and/or the interior trim panel 104 may further include one or more auxiliary connectors (not shown). Connectors 250, 252 may be positioned on the head portion of the cover 102 and its vicinity, while auxiliary connectors may be positioned on the tail portion 210 of the cover 102 and its vicinity. In some embodiments mentioned herein above, the protrusions 254, 256 may be positioned on the tail portion 220 of the cover 102 and its vicinity, and it is appreciated that protrusions mentioned above and the like may be positioned on other locations of the cover 102 and/or the interior trim panel 104 without necessarily having to depart from the spirit of the present invention.

The connector 250 of the cover 102 as illustratively depicted in FIG. 2A and the connector 252 illustratively depicted in FIG. 2B may be positioned adjacent to the bridge portion 236. Without wanting to be limited by any particular theory, it is believed that greater ease may be realized to disengage the cover 102 from the interior trim panel 104 when the protrusion 250, 252 as a connection joint is positioned close to the bridge portion 236.

Referring to FIG. 3, an alternative arrangement of the interior trim assembly 100 referenced in FIG. 1 is illustratively depicted. As shown in FIG. 3, and similar to what is shown in FIG. 2A, the cover 102 may include the protrusion 250 and the interior trim panel 104 may correspondingly include the aperture 272. The connection thereof may be similar to what is described in relation to FIG. 1. However, in relation to FIG. 3, the cover 102 may further include an auxiliary connector 310, which may be in the form of a slider that may be movable in a channel or tunnel 320. The interior trim panel 104 may have a corresponding tunnel 320 the slider 310 may engage. Movement of the slider 310 relative to the tunnel 320 results in the cover 102 moving relative to the interior trim panel 104. The cover 102 may include one slider 310 and the interior trim panel 104 may include one tunnel 320 to engage the slider 310. In other embodiments, the cover 102 may include two sliders 310 at two opposing sides along the width direction W, and the interior trim panel 104 includes two tunnels 320 to correspond to the two sliders 310. The number of sliders 310 and tunnels 320 may vary as desirable.

Further in view of FIG. 3 and FIG. 4, the tunnel 320 may include a first segment 330 extending in a first direction N1 and a second segment 325 extending in a second direction N2 different from the first direction N1. The first segment 330 may be positioned between the head portion 210 and the second segment 325. In certain embodiments, the second direction N2 may be close in value to the longitudinal direction L, with a value difference between the two of being no more than 30 degrees, 20 degrees, 10 degrees or 5 degrees.

For engagement, the slider 310 may first be positioned into the first segment 330 of the tunnel 320. When the cover 102 is at a first position S1, the protrusion 250 is still in a free state, and the tail portion 220 of the cover 102 is spaced from the tongue 274. Next, the slider 310 may slide along the tunnel 320 into the second segment 325 such that the cover 102 reaches position S2. Further next the slider 310 continues to slide toward an end position of the tunnel 320 at which time the protrusion 250 enters into the aperture 272 to form a final connection, such that the cover 102 reaches its position S3. At position S3, the slider 310 is positioned at a closed end 380, defined by an upper end 382 and a side portion 384 of the tunnel 320.

For disengagement of the cover 102 away from the interior trim panel 104, the steps mentioned in relation to the engagement process may be reversed, and therefore details about these steps are not reproduced for brevity. Without wanting to be limited by any particular theory, it is believed that engagement and disengagement of the cover 102 may be realized with relatively greater ease when engaging or disengaging connection of the cover 102 via its sliding movement is translated by or converted into a combination of steps including rotational movement along with sliding to engage or disengage the cover 102. Accordingly engagement and disengagement may be operated with less influence from the space limitations, such as space limitations along the longitudinal direction L.

In some embodiments, the interior trim panel 104 may further include a tongue 274 to support the tail portion 220 of the cover 102 at an engaged position. In some other embodiments, the tunnel 320 may include a first closed end to be sized to retain the slider 310 when the cover 102 is at the engaged position relative to the interior trim panel 104. In some other embodiments, the interior trim panel 104 may be connected to the tail portion 220 of the cover 102 via other auxiliary connectors or other connection methods. Referring to FIG. 5, an alternative of the interior trim assembly 100 depicted in FIG. 1 is illustrated. The embodiment referenced in FIG. 5 is similar to that of FIG. 3 in that the cover 102 may include the protrusion 250 and the slider 310 while the interior trim panel 104 may include the tunnel 520 and the tongue 274, with the only visible difference being that a tunnel 520 is different and alternatively design relative to the tunnel 320 in FIG. 3. Description of any parts similar to those depicted in FIG. 2A and FIG. 3 are not reproduced for brevity; however, detailed description of the design of the tunnel 520 is further detailed herein elsewhere.

Referring back again to FIG. 3 and FIG. 4, the tunnel 320 and the first segment 330 thereof in particular may extend toward the head portion 210 along the longitudinal direction L to a shielding flange 370. The shielding flange 370 may shield or hide away from sight any unpleasant view of the sides or the interior which may otherwise be visible when the cover 102 is sliding away from the interior trim panel 104.

Referring to FIG. 5 and FIG. 6, the tunnel 520 is illustratively depicted to include an open loop 540 with a gap opening 510. The open loop 540 defines a floor 550 positioned spaced apart from a ceiling 560 along the transverse direction T. The ceiling 560 and the floor 550 are respectively of a ceiling length B3 and a floor length B1 along the longitudinal direction L, where the ceiling length B3 may be smaller than the floor length B1, at least to accommodate for the presence of the gap opening 510 which is itself of a gap length B2 along the longitudinal direction L. In certain embodiments, and with an intent to provide a guided channel for the connector 310, the ceiling length B3 is no less than 50 percent, 60 percent, 70 percent, 80 percent or 90 percent and no more than 99 percent of the floor length B1.

In one or more embodiments, the tunnel 520 may similarly include a closed end 580 to retain the slider 310 when the cover 102 is at an engaged position relative to the interior trim panel 104. The first closed end 580 may include a first upper end 582 and a first side end 584.

In another one or more embodiments, the tunnel 520 may include a second closed end 570 to retain the slider 310 in the tunnel 520 when the cover 102 is to be disengaged from the interior trim panel 104. The second closed end 570 may be formed by a second side end 572 sandwiched between the ceiling 560 and the floor 550.

During an initial installation, the slider 310 of the cover 102 enter from the opening 510 into the tunnel 520, and the protrusion 250 may be pushed into the aperture 272 of the interior trim panel 104, for instance to reach position P3. During maintenance, the cover 102 may enter position P2 and then to position P1. Even at position P1, and with this design, the cover 102 is retained in the tunnel 520 optionally via the second closed end 570 and therefore does not completely dislocate from the interior trim panel 104 such that problems like cover 102 being not easily locatable during maintenance may be avoided.

After maintenance, re-installation may be carried out easily by simply pushing the cover 102 into position P3 and thereafter engaging the cover 102 at position P3. If the cover 102 is required to be removed, the protrusion 250 may be disengaged from the aperture 272 while the tail of the cover 102 may be disengaged from the tongue 274 such that the slider 31 may pass through the gap opening 510. The location of the opening may be adjusted as necessary. To provide added convenience of operation, the disengagement position of the tail portion of the cover 102 relative to the tongue 274 may be about the same location of the gap opening 510 so that by observing the tail portion of the cover 102 being moved to a disengagement position relative to the tongue 112 it may be determined that the slider 310 of the cover 102 is already at the opening position and may be pulled from the tunnel 520. The protrusion 250 and aperture 272 may already be disengaged at this position.

The gap opening 510 may be of any suitable size as desirable. To facilitate easy disengagement of the slider 310, for instance, a relatively larger opening at L direction may be formed as long as the movement of the slider 310 along the direction T may be realized at the engaged position P3 as shown in FIG. 5.

According to one or more embodiments of the present invention, an engagement or disengagement along a transverse direction such as the transverse direction T of the cover 102 relative to the base or the interior trim panel 104 may translate to an engagement or disengagement along a longitudinal direction such as the longitudinal direction L, and optionally coupled with a rotational connection. Surfaces resultant from these connections, such as a vehicle A surface, may be presented with more desirable features meeting customer satisfaction and with enhanced ease for engagement and disengagement. These features may make the cover and interior trim assembly more suitable for areas with certain space limitation, and thus make the overall design more versatile. Any suitable variations may be realized and accommodated without having to depart from the spirit of the present invention.

FIG. 1 through FIG. 6 illustratively describe the cover and trim assembly in one or more embodiments of the present invention, which may be readily employed in cover designs of any other suitable technical areas. Additionally, although the cover and trim assembly of the present invention are in general mentioned in relation to a vehicle and vehicle trims in particular, the cover design is reasonably expected to be equally applicable in other technical fields such as airplanes, ships, and furniture where pleasing exterior appearance and manageable maintenance may be particularly desirable. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A cover assembly to detachably contact an interior trim, comprising:
a cover including, along a longitudinal direction, a head portion, a tail portion and a middle portion positioned there-between, the middle portion including, along the longitudinal direction, a first middle portion, a second middle portion and a bridge portion positioned there-between, the first middle portion being of an elevation along a transverse direction over the second middle portion via the bridge portion, wherein the cover is to disengage the interior trim when a pre-determined force is exerted onto the bridge portion in an exertion direction from the second middle portion toward the first middle portion.

2. The cover assembly of claim 1, wherein the first middle portion and the bridge portion define there-between a first intersection, the second middle portion and the bridge portion define there-between a second intersection, and the first intersection is positioned between the head portion and the second intersection along the longitudinal direction.

3. The cover assembly of claim 1, wherein the cover further includes a turning portion positioned between the head portion and the first middle portion along the longitudinal direction, the turning portion being of an elevation greater than that of the first middle portion relative to the second middle portion along the transverse direction.

4. The cover assembly of claim 1, wherein the cover further includes a protrusion receivable through an aperture defined on the interior trim for engagement.

5. The cover assembly of claim 4, wherein the protrusion extends out from the head portion toward the tail portion.

6. The cover assembly of claim 4, wherein the protrusion extends out from the tail portion away from the head portion.

7. The cover assembly of claim 1, wherein the cover further includes a connector to engage a tunnel of the interior trim, such that the cover is translatable relative to the interior trim via an engagement of the connector relative to the tunnel.

8. The cover assembly of claim 7, wherein the connector is positioned between the head portion and the tail portion along the longitudinal direction.

9. An interior trim assembly comprising:
a cover including, along a longitudinal direction, a head portion, a tail portion and a middle portion positioned there-between, the middle portion including, along the longitudinal direction, a first middle portion, a second middle portion and a bridge portion positioned there-between, the first middle portion being of an elevation along a transverse direction over the second middle portion via the bridge portion; and
a base to support the cover, wherein the cover is to disengage the base when a pre-determined force is exerted onto the bridge portion in an exertion direction from the second middle portion toward the first middle portion.

10. The interior trim assembly of claim 9, wherein the base includes an aperture and the cover includes a protrusion receivable through the aperture and extending out from the head portion toward the tail portion.

11. The interior trim assembly of claim 9, wherein the base includes a tongue to support the tail portion of the cover in an engaged position.

12. The interior trim assembly of claim 9, wherein the base includes a tunnel, and the cover includes a connector, such that the cover is translatable relative to the base via an engagement of the connector relative to the tunnel.

13. The interior trim assembly of claim 12, wherein the tunnel includes a first closed end to restrict movement of the connector when the cover is in an engaged position.

14. The interior trim assembly of claim 12, wherein the tunnel includes a first segment extending in a first direction and a second segment extending in a second direction different from the first direction.

15. The interior trim assembly of claim 12, wherein the tunnel includes a ceiling and a floor positioned spaced apart from the ceiling along the transverse direction, the ceiling and the floor respectively being of a ceiling length and a floor length along the longitudinal direction, the ceiling length being no less than 50 percent in value relative to the floor length.

16. The interior trim assembly of claim 12, wherein the tunnel includes a second closed end to retain the connector when the cover is to disengage the base.

17. A cover assembly to detachably contact an interior trim, comprising:
a cover, including along a longitudinal direction, a head portion, a tail portion and a middle portion positioned there-between, the middle portion including, along the longitudinal direction, a first middle portion, a second middle portion and a bridge portion positioned there-between, wherein the first middle portion and the bridge portion define there-between a first intersection, the second middle portion and the bridge portion define there-between a second intersection, and the first intersection is positioned between the head portion and the second intersection along the longitudinal direction, and wherein the cover further includes a protrusion receivable through an aperture defined on the interior trim for engagement.

18. The cover assembly of claim 17, wherein the protrusion extends out from the head portion toward the tail portion.

19. The cover assembly of claim 17, wherein the protrusion extends out from the tail portion away from the head portion.

20. The cover assembly of claim 17, wherein the cover further includes a connector positioned between the head portion and the tail portion along the longitudinal direction and to engage a tunnel of the interior trim, such that the cover is translatable relative to the interior trim via an engagement of the connector relative to the tunnel.

* * * * *